United States Patent
Narasimhan et al.

(10) Patent No.: US 6,811,894 B2
(45) Date of Patent: Nov. 2, 2004

(54) CERAMIC TURBINE BLADE ATTACHMENT HAVING HIGH TEMPERATURE, HIGH STRESS COMPLIANT LAYERS AND METHOD OF FABRICATION THEREOF

(75) Inventors: Dave Narasimhan, Flemington, NJ (US); Alexander S. Kozlov, Wharton, NJ (US); Margaret Eagan, Boonton Township, NJ (US); Milton Ortiz, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 153 days.

(21) Appl. No.: 10/455,830

(22) Filed: Jun. 6, 2003

(65) Prior Publication Data

US 2004/0058191 A1 Mar. 25, 2004

Related U.S. Application Data

(62) Division of application No. 09/886,757, filed on Jun. 20, 2001, now Pat. No. 6,602,548.

(51) Int. Cl.$^7$ ............................................... B32B 15/00
(52) U.S. Cl. ................. 428/680; 428/469; 428/472; 428/699; 428/702; 428/632; 428/670; 428/672; 428/679; 428/667; 416/229 R; 416/219 R; 416/244 R
(58) Field of Search ........................ 428/469, 472, 428/472.1, 699, 702, 632, 621, 655, 670, 672, 680, 679, 666, 667; 416/241 B, 241 R, 219 R, 248, 244 R, 229 R

(56) References Cited

U.S. PATENT DOCUMENTS

| | | |
|---|---|---|
| 4,399,199 A | 8/1983 | McGill et al. |
| 4,417,854 A | 11/1983 | Cain et al. |
| 4,610,934 A | 9/1986 | Boecker et al. |
| 4,677,035 A | 6/1987 | Fiedler et al. |
| 5,292,596 A | 3/1994 | Privett, III et al. |
| 5,427,866 A | 6/1995 | Nagaraj et al. |
| 5,443,789 A | 8/1995 | Harris et al. |
| 5,712,050 A | 1/1998 | Goldman et al. |
| 6,066,405 A | 5/2000 | Schaeffer |
| 6,127,048 A | 10/2000 | Beele |
| 6,132,175 A | 10/2000 | Cai et al. |
| 6,431,781 B1 * | 8/2002 | Schenk |
| 6,602,548 B2 * | 8/2003 | Narasimhan et al. |

* cited by examiner

Primary Examiner—Deborah Jones
Assistant Examiner—Jennifer McNeil
(74) Attorney, Agent, or Firm—Robert Desmond, Esq.

(57) ABSTRACT

A nickel base single crystal compliant layer on a ceramic blade has the capability to sustain high stresses and high operating temperature. Layers of nickel and platinum bonded on a single crystal superalloy over a sputtered gold-chromium layer support the high stress levels at elevated temperature without extrusion of the soft platinum or nickel layer and without destruction of an NiO compliant surface. The compliant layers have survived stress and temperature conditions without failure to the ceramic blade and the system can be stressed/heated and unloaded/cooled repeatedly without damage to the ceramic blades. A single crystal nickel base superalloy (i.e., SC180) has high strength properties at elevated temperature. Thin layers of chromium followed by gold are e-beam evaporated on one side of a polished surface of the alloy. Pure nickel is electroplated over this e-beam gold-chromium layer. Platinum is either electroplated or plated electrolessly over the nickel layer. The structure is annealed in vacuum or inert atmosphere to allow the diffusion of gold-chromium alloy into the superalloy and permit the nickel layer and diffusion of nickel into platinum to form a multilayer structure which is metallurgically bonded. The sheet is oxidized in air to allow diffusion of the nickel layer through the platinum to come to the surface and oxidize forming nickel oxide. This nickel oxide layer acts as the load distribution layer which does not extrude and the structural integrity of the compliant layer is maintained by the high-strength single crystal superalloy.

14 Claims, 7 Drawing Sheets

CERAMIC TURBINE BLADE ATTACHMENT HAVING HIGH TEMPERATURE, HIGH STRESS COMPLIANT LAYERS AND METHOD OF FABRICATION THEREOF

CROSS REFERENCE TO RELATED APPLICATION

The present application is a divisional of U.S. patent application Ser. No. 09/886,757, filed Jun. 20, 2001 now U.S. Pat. No. 6,602,548.

BACKGROUND OF THE INVENTION

The present invention generally relates to turbine blades and, more particularly, to compliant layers employed to attach turbine blades to a disk.

Gas turbine power plants are used as the primary propulsive power source for aircraft, in the forms of jet engines and turboprop engines, as auxiliary power sources for driving air compressors, hydraulic pumps, etc. on aircraft, and as stationary power supplies such as backup electrical generators for hospitals and the like. The same basic power generation principles apply for all of these types of gas turbine power plants. Compressed air is mixed with fuel and burned, and the expanding hot combustion gases are directed against stationary turbine vanes in the engine. The vanes turn the high velocity gas flow partially sideways to impinge upon turbine blades mounted on a turbine disk or wheel that is free to rotate.

The force of the impinging gas causes the turbine disk to spin at high speed. Jet propulsion engines use this power to draw more into the engine and then high velocity combustion gas is passed out the aft end of the gas turbine, creating forward thrust. Other engines use this power to turn a propeller or an electric generator.

The turbine blades and vanes lie at the heart of the power plant, and it is well established that, in most cases, they are one of the limiting factors in achieving improved power plant efficiency. In particular, because they are subjected to high heat and stress loadings as they are rotated and impacted by the hot gas, there is a continuing effort to identify improvements to the construction and/or design of turbine blades to achieve higher performance.

Much research and engineering has been directed to the problem of improved turbine blade materials. The earliest turbine blades were made of simple cast alloys having relatively low maximum operating temperatures. The alloy materials have been significantly improved over a period of years, resulting in various types of nickel-based and cobalt-based superalloys that are in use today.

Ceramic blades (Si3N4) are used when a turbine needs to be run at elevated temperatures to improve the efficiency and performance of turbine engines. However, ceramic blades need to be inserted into metallic turbine disks. Because ceramic blades are susceptible to fracture by local point loading, a compliant layer is needed to redistribute the ceramic blade loading. As the ceramic is operated at high temperature and high speeds in a turbine, a compliant layer is needed which supports the loading without extrusion or creeping and yet plastic or soft enough to redistribute the loading at the ceramic compliant layer interface. At each engine cycle, the blade must part from the metallic turbine disk to accommodate the thermal expansion differences between ceramic and metal to prevent crushing of the blade root.

U.S. Pat. No. 6,132,175 for Compliant Sleeve For Ceramic Turbine Blades discloses the use of a compliant layer fabricated from a cobalt-based low temperature capable superalloy which is bonded to a thin layer of nickel and platinum. The structure is oxidized to form a NiO surface, which contacts the ceramic blade. The compliant layer is lubricated with BN (Hexagonal Boron nitride) and sputtered gold.

U.S. Pat. No. 6,127,048 for Article Of Manufacture Having A Metal Substrate With An Oxide Layer And An Improved Anchoring Layer And Method Of Bonding The Same describes the formation of anchored thermal barrier coating on ceramic blades. It uses an anchoring layer primarily made from ternary oxides. The '048 patent does not relate to a compliant layer. Essentially, the blades which need to be protected from thermal conditions of the engine are coated with thermal barrier layers. This patent suggests that intermediate ternary oxides improve the bonding of the zirconia thermal barrier coating. The disclosed blade has coatings of low thermal conductivity oxides that do not provide the required compliance and durability on repeated cycling (both thermal and mechanical movement) needed for the present application.

U.S. Pat. No. 6,066,405 for Nickel-Base Superalloy Having An Optimized Platinum-Aluminide Coating uses a platinum-aluminum coating over metallic blades and may use a ceramic thermal barrier coating over the blade. This patent is similar to the previous patent disclosing a thermal barrier coating for metallic turbine blades. This has nothing to do with compliant layers for ceramic blade attachment. Platinum aluminide is an intermetallic compound and lacks the ductility of platinum and, thus, will not provide the required compliance and load distribution characteristics needed to support a ceramic blade. The ceramic thermal barrier coating is also very hard and if it comes in contact with a ceramic blade, it will shatter it due to localized loading.

U.S. Pat. No. 5,712,050 for Superalloy Component With Dispersion-Containing Protective Coating describes a coating for a superalloy article which is a nickel based superalloy containing dispersoids of oxides of yttrium, hafnium and or a rare earth. The coating protects the superalloy body from oxidation, fatigue, etc. This patent describes a protective coating on superalloy articles such as blades and has nothing to do with compliant layers. If a similar coating were used for compliant layers, it would not work because the nickel based superalloy with dispersoids lacks the compliance and the hard particles will produce localized contact on the ceramic blade creating point loading and fracture.

What is still needed is a compliant layer coating for a ceramic turbine blade wherein the layer is capable of operating at higher temperatures and levels of stress in an oxidizing environment.

SUMMARY OF THE INVENTION

The present invention resides in the use of a nickel based single crystal compliant layer on a ceramic blade, which has the capability to sustain the high stresses at high operating temperatures, but the properties of such a layer are easily degraded by contamination as well as nucleation of secondary grains. The high stresses applied at high temperature can easily squeeze out the thin layers of soft metals such as platinum and nickel. When this happens, the nickel oxide layer generated will break and disappear on subsequent loading and unloading cycles. The invention exploits the discovery that layers on nickel and platinum bonded on a single crystal superalloy over a sputtered gold-chromium layer can indeed support the high stress levels at elevated temperature without extrusion of the soft platinum or nickel layer and without destruction of an NiO compliant surface. The compliant layers have survived stress and temperature conditions without failure to the ceramic blade and the system can be stressed/heated and unloaded/cooled repeatedly without damage to the ceramic blades.

A high strength superalloy is employed due to its single crystal nature and a coating is used which does not degrade the single crystal alloy, yet provides sufficient compliance to support the ceramic blade under conditions of high stress (such as about 50 Ksi to 100 Ksi) and high temperature (such as about 760° C. to 875° C.). The blade is released without bond formation on each cycle so that, during cooling, the blade is not crushed by the dove tail slot due to the large thermal expansion coefficient of the metallic disk alloy compared to the silicon nitride ceramic blade.

This invention may use a single crystal nickel base superalloy (e.g., SC180) which has high strength properties (e.g., about 60 Ksi to 160 Ksi yield depending on orientation) at elevated temperature (e.g., about 760° C. to 875° C.). Thin layers of chromium followed by gold are e-beam evaporated on one side of a polished surface of the alloy. Pure nickel is electroplated over this e-beam gold-chromium layer. Platinum is either electroplated or plated electrolessly over the nickel layer. The structure is annealed in vacuum or inert atmosphere to allow the diffusion of gold-chromium alloy into the superalloy and permit the nickel layer and diffusion of nickel into platinum to form a multilayer structure which is metallurgically bonded. The sheet is oxidized in air at about 900 to 1000° C. to allow diffusion of the nickel layer through the platinum to come to the surface and oxidize, forming nickel oxide. This nickel oxide layer acts as a load distribution layer, which does not extrude and the structural integrity of the compliant layer is maintained by the high-strength single crystal superalloy.

These and other features, aspects and advantages of the present invention will become better understood with reference to the following drawings, description and claims.

DETAILED DESCRIPTION OF THE INVENTION

Figure 1:
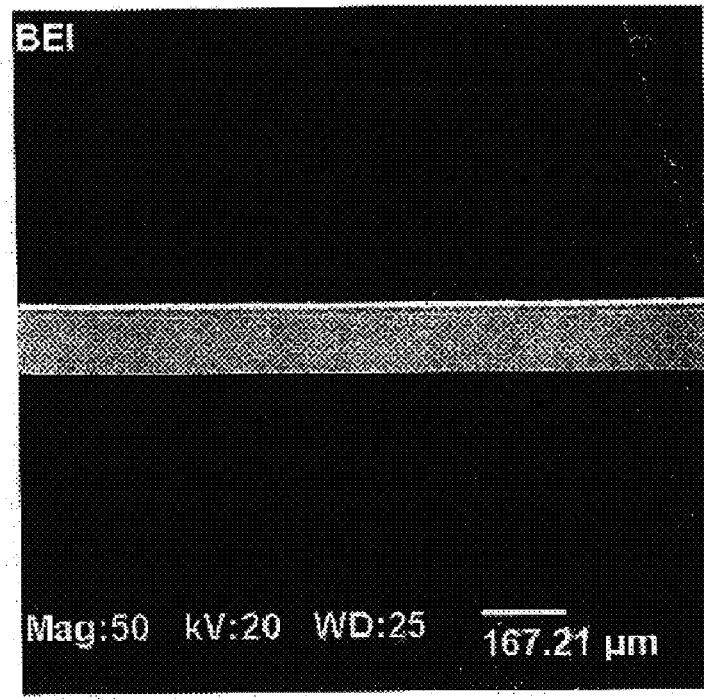
FIGS. 1–7 are respective micro-photographs of a sample of an embodiment of the present invention.

The following detailed description is the best currently contemplated modes for carrying out the invention. The description is not to be taken in a limiting sense, but is made merely for the purpose of illustrating the general principles of the invention.

The present invention may employ about a 0.005 thousands of an inch to 0.020 thousands of an inch thick single crystal nickel base superalloy such as SC180 (described in EPO Patent Application No. 246,082 and incorporated herein by reference), which has high strength properties (about 160 Ksi) at elevated temperature (about 1400° F., 760° C.). Thin layers (e.g., about 0.0012 thousands of an inch to 0.0032 thousands of inch and preferably about 0.002 thousands of an inch) of chromium followed by gold (about 0.02 thousands of an inch to 0.04 thousands of an inch and preferably 0.032 thousands of an inch thick) can be e-beam evaporated on one side of a polished surface of the alloy. Pure nickel can be electroplated to a thickness of about 0.0012" to 0.0018", and preferably about 0.0015", over this e-beam gold-chromium layer. Platinum may be either electroplated or plated electrolessly over the nickel layer to a thickness of about 0.0004" to 0.0007", and preferably about 0.0005".

The structure can be annealed at about 800° C. to 925° C., and preferably about 900° C., for about 0.4 to 0.6 hours, and preferably about 0.5 hours, in vacuum or inert atmosphere to allow the diffusion of gold-chromium alloy into the superalloy and nickel layer and diffusion of nickel into platinum to form a multilayer structure which is metallurgically bonded. The sheet can be oxidized in air at about 950° C. to 1050° C., and preferably about 1000° C. for about 0.75 to 1.25 hours, and preferably about 1 hour, to allow diffusion of the nickel layer through platinum to come to the surface and oxidize, forming a nickel oxide of about 0.0003" to 0.0006", and preferably about 0.0004". This nickel oxide layer acts as a load distribution layer, which does not extrude and the structural integrity of the compliant layer is maintained by the high-strength single crystal superalloy.

EXAMPLE

A single crystal superalloy sheet of SC 180 (0.009" thick) was mechanically polished first to remove cutting damage and the thickness was reduced to 0.006" to 0.007". It was then cleaned with a mixture of ammonium hydroxide and hydrogen peroxide. One side of the superalloy sheet was coated to a thickness of about 0.002 thousands of an inch chromium and about 0.032 thousands of an inch gold by e-beam evaporation. The backside was masked and nickel was electroplated from a Watt's bath to a thickness of about 0.0015" and platinum was electroplated over the nickel layer to a thickness of about 0.0005". The mask was removed and the multilayer superalloy sheet was annealed at about 900° C. for about 0.5 hours in evacuated and argon back filled atmosphere to allow diffusion and metallurgical bond formation. The structure was oxidized in air at about 1000° C. for about 1 hour to generate a NiO layer over the platinum layer by diffusion of nickel through platinum to the free surface where it oxidizes freely.

Figure 2:
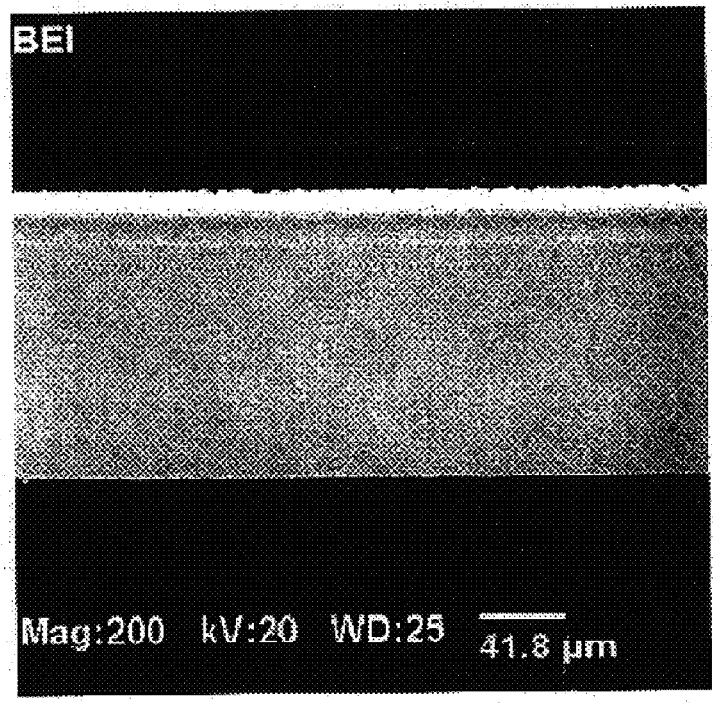
Figure 3:
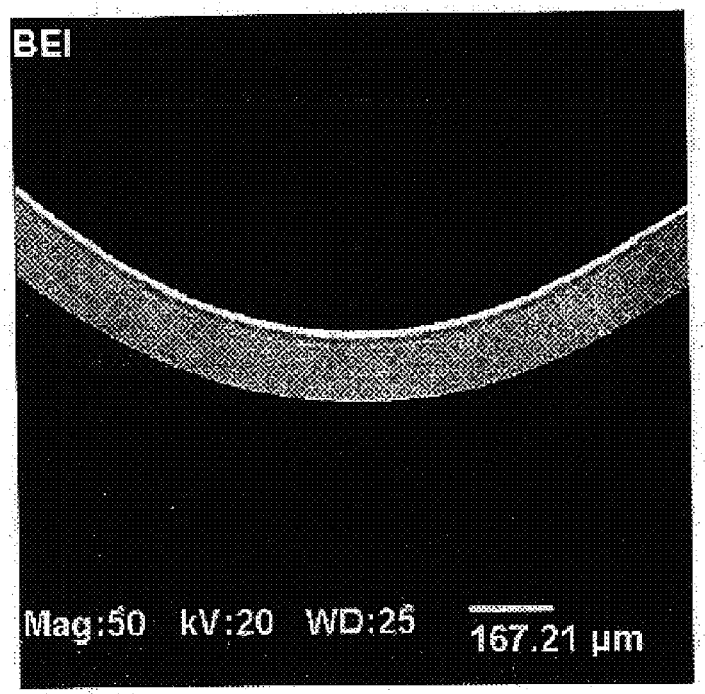
Figure 4:
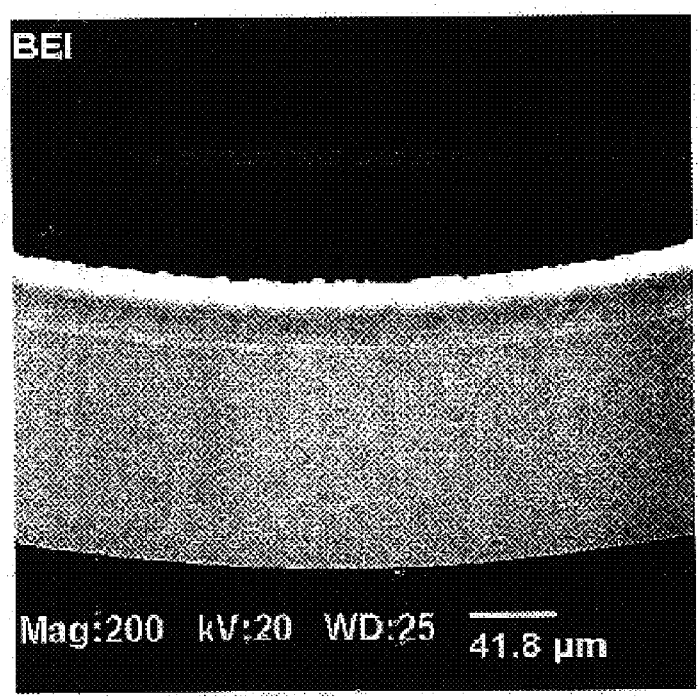
Figure 5:
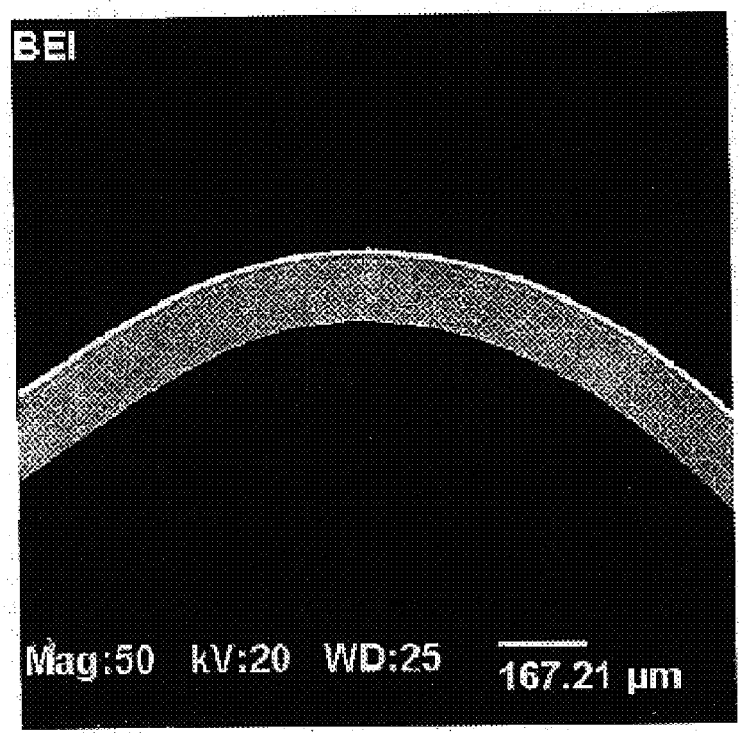
Figure 6:
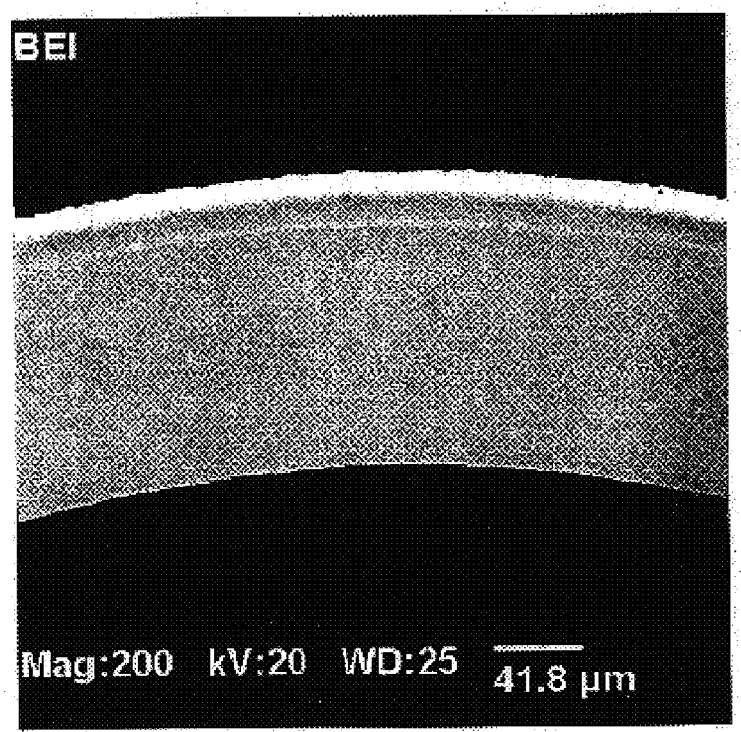
Figure 7:
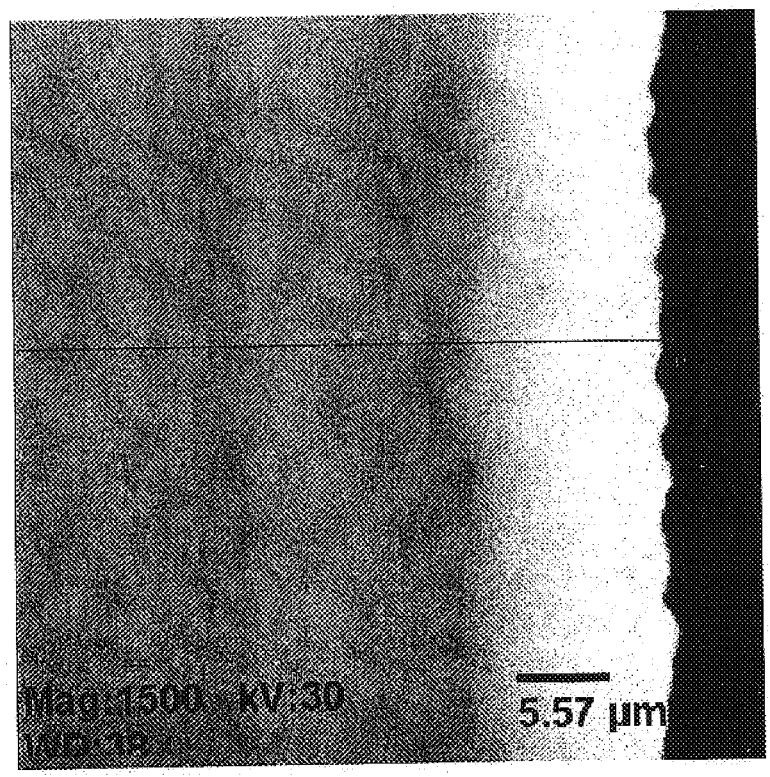

FIGS. 1–7 are microphotographs of the resulting diffusion profiles for the above example in the unoxidized state. FIGS. 1 and 2 are at magnifications of 50× and 200×, respectively, with the sample unbent. FIGS. 3 and 4 are at magnifications of 50× and 200×, respectively, with the sample sheet bent in the direction of the coated side. FIGS. 5 and 6 are at magnifications of 50× and 200×, respectively, with the sample sheet bent in the opposite direction. FIG. 7 is a 1500× magnification microphotograph of the bent area. The microphotographs of FIGS. 1–7 show no delamination in the bent region and virtually no surface cracking, even at a magnification of 1500×.

Figure 8:
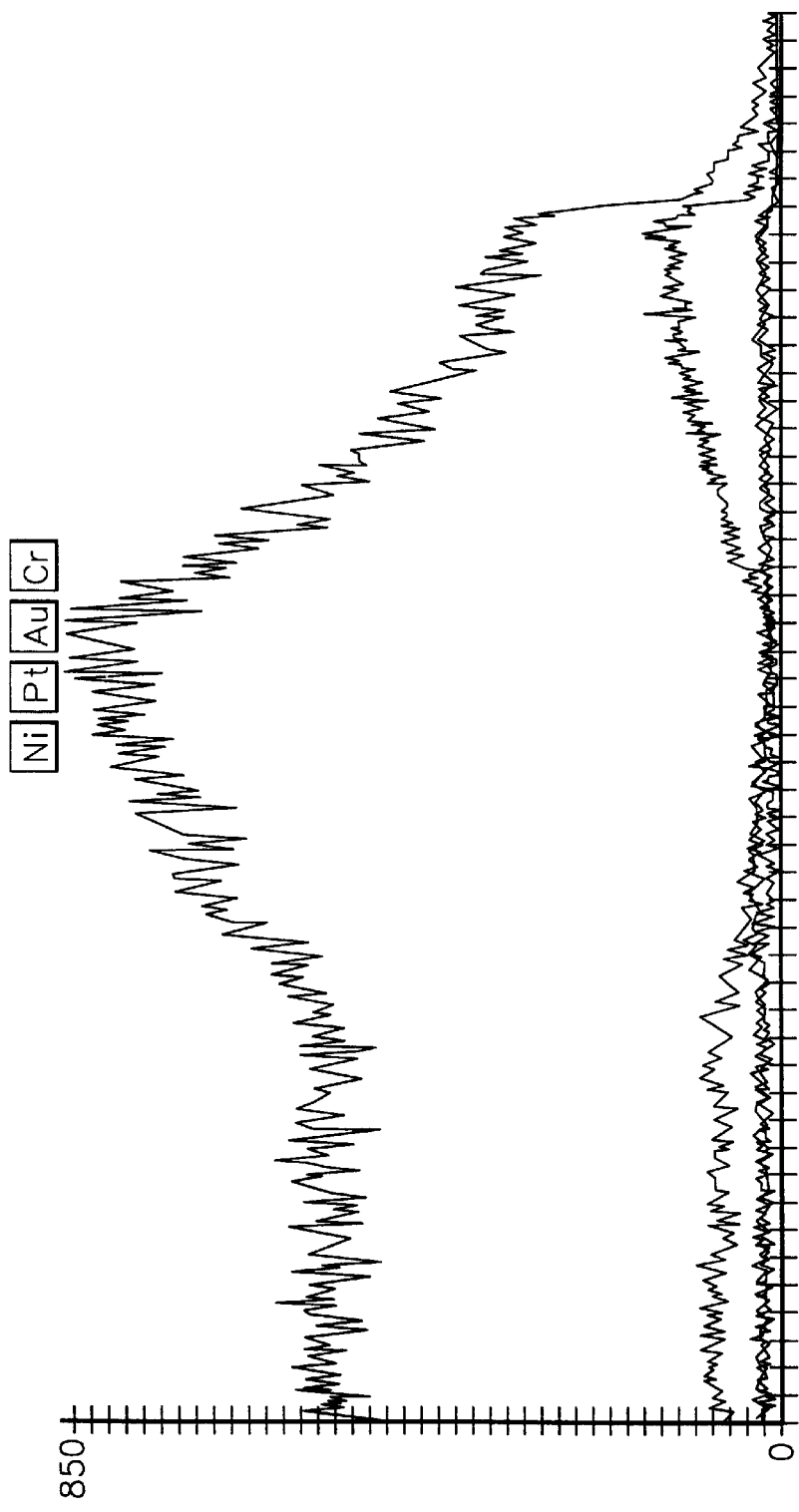
FIG. 8 is an integrated graph of linescan results near the surface of the sample of FIGS. 1–7.
Figure 9:
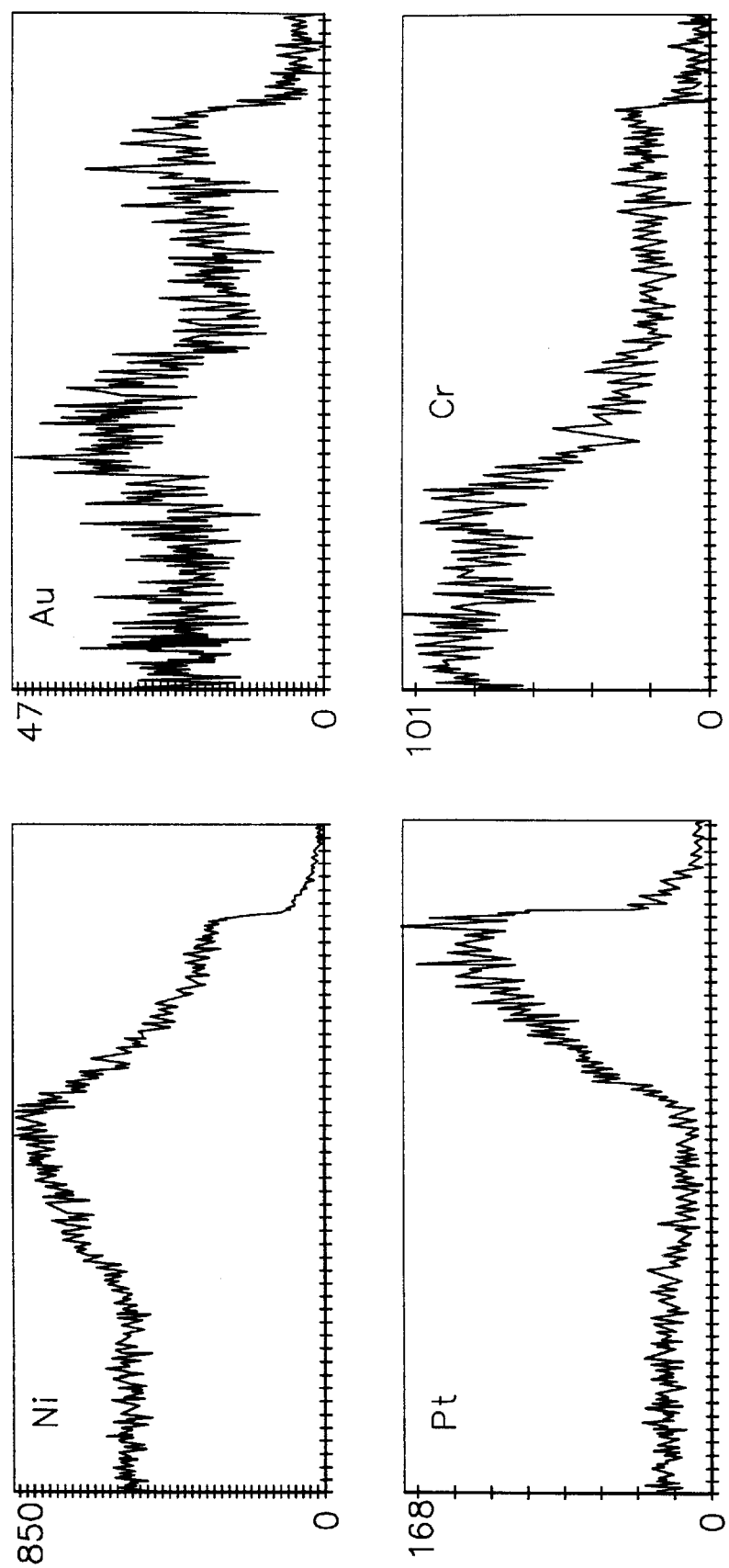
FIG. 9 is a series of separate graphs of the linescan results of FIG. 8, but showing the individual coating materials.

FIGS. 8 and 9 illustrate EDX linescan results on an integrated graph and on separate graphs, respectively, showing the relative amounts of Ni, Pt, Au and Cr over a 47 $\mu$m distance through the coating toward the free surface for the above example. It can be seen that the outermost area (right) comprises both nickel and platinum, but thereafter the nickel quickly becomes predominant toward the left. The gold and chromium are present in relatively small amounts along the entire scanned line. The profile illustrates the diffusion of the nickel through the platinum toward the free surface.

Figure 10:
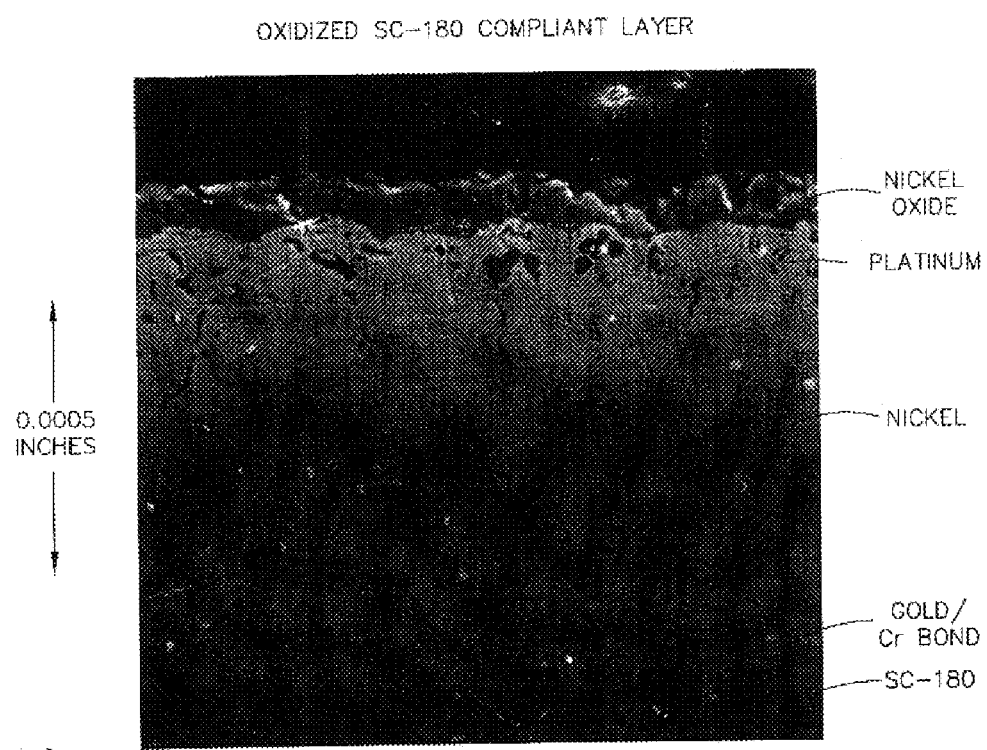
FIG. 10 is a micro-photograph of an oxidized SC-180 compliant layer in accordance with the invention.

FIG. 10 illustrates the oxidized SC-180 compliant layer from the superalloy up through the diffused and oxidized nickel outer layer.

It will be understood that the present invention has been disclosed herein in the form of a preferred embodiment. Moreover, it will be understood that although precise layer thickness, temperature and other parameters have been defined for each step of the coating process disclosed, these parameters may be readily altered while still achieving the advantageous results described herein.

Thus, the scope of the invention hereof is to be limited only by the appended claims and their equivalents.

We claim:

1. A ceramic blade for turbines, the blade having a compliant layer coating attachment comprising:

a single crystal superalloy;

evaporated layers of chromium and gold on one side of said superalloy;

a plated layer of nickel over said chromium and gold; and a plated layer of platinum over said nickel layer.

2. The blade coating recited in claim 1, wherein the superalloy is nickel-based and has a thickness in the range of about 5 to 20 thousands of an inch.

3. The blade coating attachment recited in claim 1, wherein said layer of nickel has a thickness in the range of about 1.2 to 1.8 thousands of an inch.

4. The blade coating attachment recited in claim 1, wherein said layer of platinum has a thickness in the range of about 0.4 to 0.7 thousands of an inch.

5. The blade coating attachment recited in claim 1, wherein said layers of chromium and gold have a thickness in the range of about 0.0012 to 0.0032 thousands of an inch and about 0.02 to 0.04 thousands of an inch, respectively.

6. The blade coating attachment recited in claim 1, further comprising a diffusion of said nickel layer into said platinum layer.

7. The blade coating attachment recited in claim 6, further comprising a load distribution layer of nickel oxide formed from oxidation of said diffused nickel.

8. The blade coating attachment recited in claim 1, wherein said nickel is diffused through said platinum to form a nickel oxide surface to provide a load distribution layer for supporting said ceramic blade.

9. A ceramic blade for turbines, the blade having a compliant layer coating attachment comprising:

a single crystal nickel base superalloy;

evaporated layers of chromium and gold on one side of said superalloy;

a plated layer of nickel over said chromium and gold; and a plated layer of platinum over said nickel layer;

wherein said superalloy has a thickness in the range of about 5 to 8 thousands of an inch;

wherein said layers of chromium and gold have a thickness in the range of about 0.0012 to 0.0032 thousands of an inch and about 0.02 to 0.04 thousands of an inch, respectively;

wherein said layer of nickel has a thickness in the range of about −1.2 to 1.8 thousands of an inch;

wherein said layer of platinum has a thickness in the range of about 0.4 to 0.7 thousands of an inch;

said nickel layer being diffused into said platinum layer; and a load distribution layer of nickel oxide formed from oxidation of said diffused nickel.

10. A ceramic blade for turbines, the blade having a compliant layer coating attachment comprising:

a single crystal nickel base superalloy;

evaporated layers of chromium and gold on one side of said superalloy;

a plated layer of nickel over said chromium and gold;

a plated layer of platinum over said nickel layer;

said nickel layer being diffused into said platinum layer; and a load distribution layer of nickel oxide formed from oxidation of said diffused nickel.

11. The blade coating attachment of claim recited in claim 10 wherein said superalloy has a thickness in the range of about 5 to 8 thousands of an inch.

12. The blade coating attachment of claim recited in claim 10 wherein said layers of chromium and gold have a thickness in the range of about 0.0012 to 0.0032 thousands of an inch and about 0.02 to 0.04 thousands of an inch, respectively.

13. The blade coating attachment of claim recited in claim 10 wherein said layer of nickel has a thickness in the range of about 1.2 to 1.8 thousands of an inch.

14. The blade coating attachment of claim recited in claim 10 wherein said layer of platinum has a thickness in the range of about 0.4 to 0.7 thousands of an inch.

* * * * *